United States Patent [19]
Becht et al.

[11] Patent Number: 5,094,000
[45] Date of Patent: Mar. 10, 1992

[54] HAND-HELD POWER TOOL WITH A ROTARY DRIVEN TOOL

[75] Inventors: Reimund Becht, Hunfelden; Hans-Jurgen Kriegel, Netzbach; Tayfun S. Thielmann, Wiesbaden, all of Fed. Rep. of Germany

[73] Assignee: Black & Decker Inc., Newark, Del.

[21] Appl. No.: 663,384

[22] Filed: Mar. 1, 1991

[30] Foreign Application Priority Data

Mar. 2, 1990 [DE] Fed. Rep. of Germany ....... 4007030

[51] Int. Cl.$^5$ .................... B27C 1/00; B23D 57/00; F16D 51/00
[52] U.S. Cl. .................................... 30/475; 30/382; 188/71.1
[58] Field of Search ............... 30/475, 476, 477, 381, 30/382, 383; 188/71.1, 74, 75, 77.2

[56] References Cited

U.S. PATENT DOCUMENTS

| 3,074,517 | 1/1963 | Kohli | 188/75 |
|---|---|---|---|
| 3,313,379 | 4/1967 | Dence | 188/77.2 |
| 3,679,027 | 7/1972 | Jansson | 188/74 |
| 4,335,514 | 6/1982 | Overy et al. | 30/382 |
| 4,433,710 | 2/1984 | Posta | 30/475 |
| 4,487,294 | 12/1984 | Geeck | 188/77 R |
| 4,625,406 | 12/1986 | Fushiya et al. | 30/381 |

FOREIGN PATENT DOCUMENTS

| 0042918 | 1/1982 | European Pat. Off. |
|---|---|---|
| 0235670 | 9/1987 | European Pat. Off. |
| 890419 | 5/1950 | Fed. Rep. of Germany |
| 8908924 | 10/1989 | Fed. Rep. of Germany |

*Primary Examiner*—Douglas D. Watts
*Assistant Examiner*—Paul M. Heyrana, Sr.
*Attorney, Agent, or Firm*—Dennis A. Dearing; Charles E. Yocum; Edward D. C. Bartlett

[57] ABSTRACT

A hand-held power tool with a rotary driven tool, in particular a planer or a circular saw, is arranged so that on switching off the drive, which can be switched on and off by means of a trigger (15), a brake element (34), which is ineffective when the drive is switched on, is brought into braking engagement with a brake part (51) rotatingly driven by the drive. The tool comprises a safety element (21) which co-operates with the trigger (15) and which can be displaced between a safety position in which the trigger (15) cannot be moved to switch on the drive, and a release position in which the trigger (15) can be moved into the position to switch on the drive. The safety element (21) is urged by spring pressure towards the safety position and is held in the release position when the trigger (15)L is in the switch-on position. The safety element (21) is coupled mechanically with the brake element (34) so that in the release position of the safety element the brake element is not in the braking engagement, and in the safety position it is in braking engagement.

20 Claims, 3 Drawing Sheets

HAND-HELD POWER TOOL WITH A ROTARY DRIVEN TOOL

BACKGROUND TO THE INVENTION

The invention relates to a hand-held power tool with a rotary driven tool, in particular a planer or a circular saw, in which, on switching off the drive, which can be switched on and off by a switch activator or trigger, a brake element, which is ineffective when the drive is switched on, is brought into braking engagement with a brake part which is rotatingly driven by the drive.

In a known hand-held power tool of this type (EP-A-0 042 918), inter alia, a brake band is provided for rapidly braking the rotating tool which brake band, when the power supply is interrupted, is pulled by spring action into engagement with a pulley surrounded by the brake band and thus causes a braking action. The brake band is coupled with an electromagnet such that the excitation of the latter releases the brake band from its engagement with the pulley by means of pivoting flaps.

This known construction, therefore, in addition to the drive motor for the electric power tool and the circuit arrangement co-operating therewith, requires an electromagnet by means of which the brake band is released from braking engagement with a pulley. Not only are the production costs increased thereby, but in addition, the electromagnet also takes up a relatively large amount of space so that the total dimensions of the hand-held power tool are relatively large.

BRIEF SUMMARY OF THE INVENTION

The object of the invention is to improve a hand-held power tool with a rotary driven tool in such a way that in a simple and compact construction rapid braking of the rotating tool is effected when the drive is switched off.

To achieve this object a hand-held power tool of the type mentioned in the introduction is constructed according to the invention so that the switch activator or trigger, co-operates with a safety element which can be shifted between a safety position in which the trigger cannot be moved to switch on the drive, and a release position, in which the trigger can be moved into position to switch on the drive, in which spring means urges the safety element in the direction of the safety position, and the safety element is held in the release position when the trigger is in the switch-on position, and such that the safety element is coupled mechanically with the brake element, so that the brake element is disengaged from the braking position when the safety element is in the release position and is in braking engagement when the safety element is in the safety position.

In the hand-held power tool according to the invention, therefore there is a safety element, which is usual per se and which co-operates with the trigger. Such safety element ensures that it is only possible to switch on the hand-held power tool if the safety element has been moved into the release position beforehand by the operator. This prevents the drive from being activated by accidental displacement of the trigger in such power tool.

In the hand-held power tool according to the invention, the safety element is coupled mechanically with the brake element, so that when the safety element is moved into the release position, the brake element is moved out of the braking position, i.e. the braking engagement is canceled, before the trigger can be moved into the position to switch on the drive. Since the safety element is held in the release position when the trigger is in the switch-on position, i.e. when the drive is activated, the brake element is also held out of braking engagement while the drive is switched on.

When the trigger returns to the switch-off position, the safety element is released and due to the spring means acting on it returns to the safety position. Due to the mechanical coupling this movement into the safety position causes the brake element to move into braking engagement and therefore brings to a halt the tool which otherwise would still be rotating.

In the hand-held power tool according to the invention, therefore, the braking engagement is effected and canceled depending on the movement of the safety element, which is mechanically coupled with the brake element, so that apart from the relatively simple coupling no additional components or measures are necessary.

The brake element is preferably spring urged into braking engagement, so that when the safety element moves into the safety position it is pushed into braking engagement without the operator, who has displaced the safety element, having to apply any additional braking force.

In a particularly preferred embodiment of the invention, when the safety element is in the safety position the brake element is in frictional engagement with a braking surface formed on the brake part, and therefore the brake element operates like a conventional friction brake, which means on the one hand that the brake element and braking surface are of simple construction and on the other that, due to the frictional forces which build up when the braking engagement is produced, a relatively uniform, shock-free braking process is achieved.

The braking surface can be formed on an exterior surface lying concentric to the axis of rotation, and can consist, for example, of an annular groove the side walls of which converge to the base of the groove so that the brake element can enter this annular groove and can engage with the side walls of the annular groove.

The brake element comprises a rigid body which is pivotably mounted towards one end on an axle, and is connected towards the other end with the safety element. The rotating braking surface moves lengthwise of the brake element.

In a construction of this type, if the edge of the section of the brake element facing the braking surface, which section which lies between the end regions and comes in contact with the braking surface, is curved corresponding to the braking surface, not only is there contact over a large surface area, but the engagement between the braking surface and the brake element can increase somewhat during the braking process.

In a particularly simple construction the mechanical coupling between safety element and brake element consists of a rod linkage.

BRIEF DESCRIPTION OF THE DRAWINGS

The invention is explained in more detail in the following description with reference to the accompanying drawings of a preferred embodiment in the form of an electrically powered hand-held planer.

DETAILED DESCRIPTION OF THE INVENTION

Figure 1:
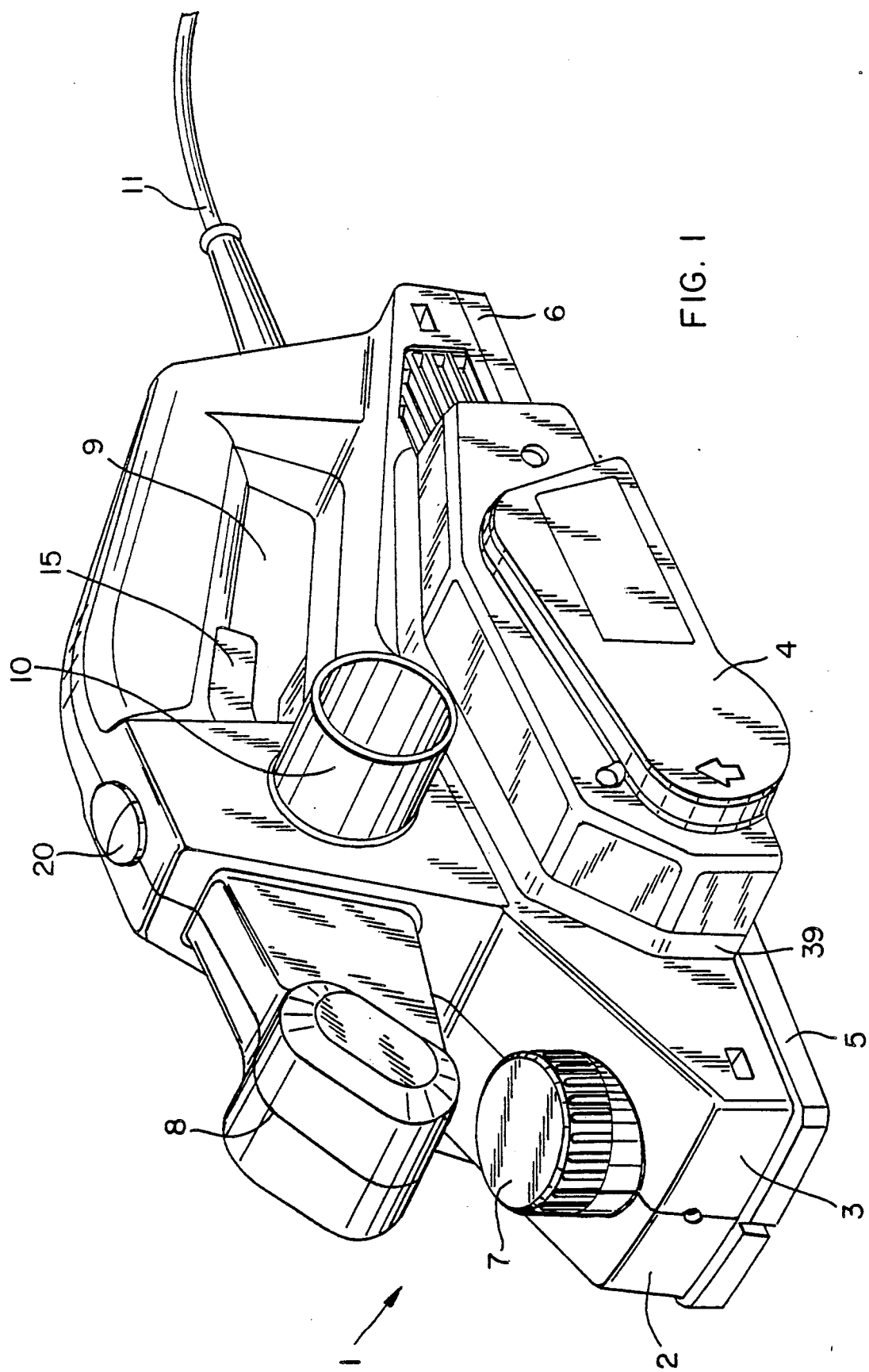
FIG. 1 shows a perspective representation of a hand-held planer.

The hand-held planer 1 shown in FIG. 1 has a casing composed of two halves 2, 3, with a detachable cover 4 screwed on to a projecting edge 39 on the outside of casing half 3. The casing halves 2, 3 of the casing form a forward-projecting additional handle 8 and also a grip opening 9, into which a switch activator or trigger 15 projects in the usual manner and is used to activate an on/off switch of the planer. The trigger 15, as will be described later, can only be moved into the on-position if a safety switch member 20 projecting from the top of the casing has been shifted beforehand.

Between the safety switch member 20 and the cover 4 a sawdust vent is provided in casing half 3 in the form of a laterally projecting tubular connector 10. On the under-side of the casing halves 2, 3, there is a stationary shoe 6 and a front shoe section 5, which can be moved up and down in a known manner to adjust the depth of cut, the height of which can be altered by means of a rotary knob 7. A cable 11 for connecting the hand-held planer 1 to a power supply is passed into the casing at its rear end.

Figure 2:
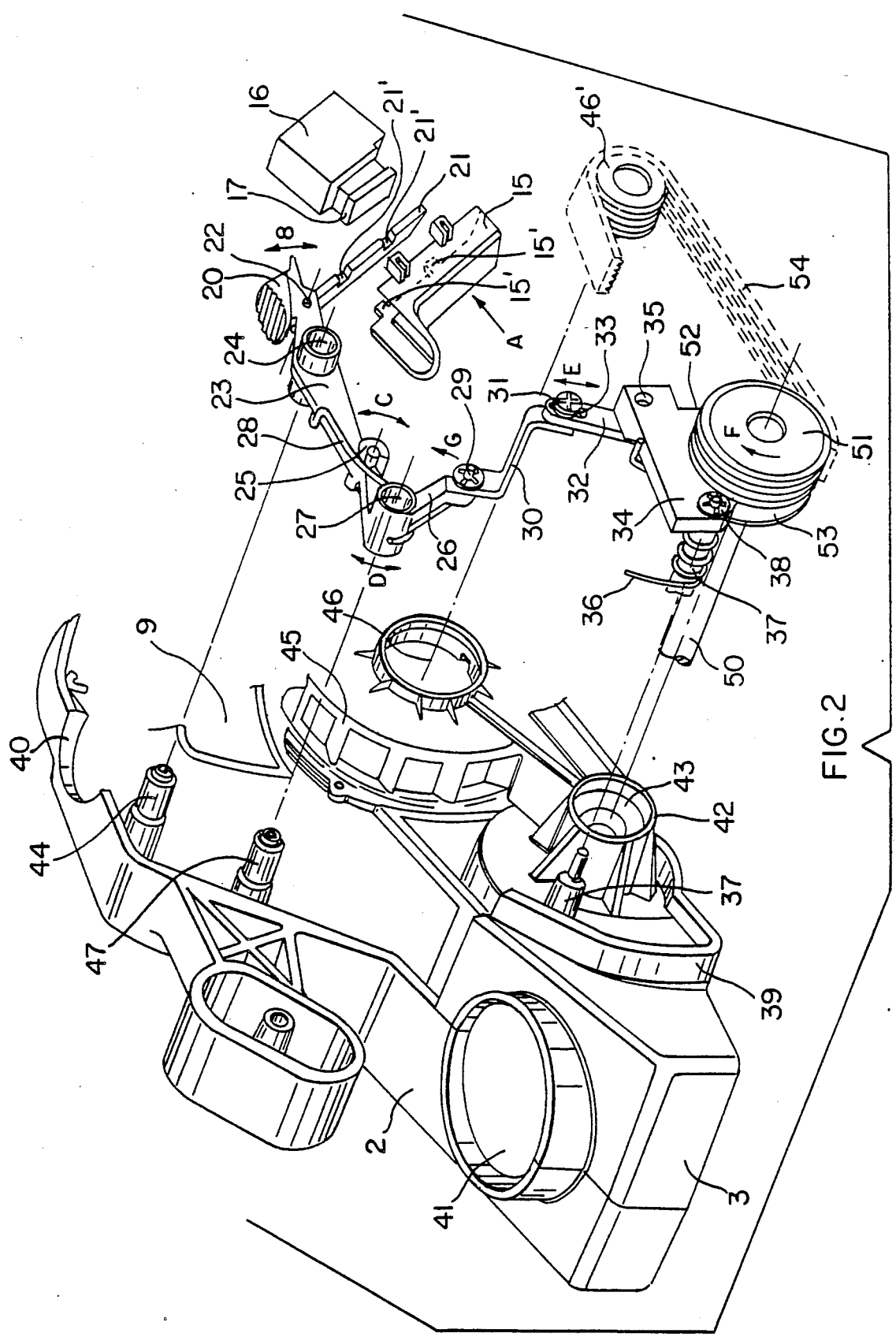
FIG. 2 shows an exploded detailed representation of parts of the casing of the hand-held planer of FIG. 1 and also an arrangement housed in a casing of the planer for bringing the planer to rest.

The planer 1 is essentially conventional in its interior construction, and therefore only the parts which appear necessary for the explanation of the invention are shown in FIG. 2.

With reference to the left-hand side of FIG. 2, in which the casing halves 2, 3 are shown without the cover 4 of FIG. 1 and also with a top part of the casing half 3 cut away, a receiving opening 41 for adjustment mechanism connected to the rotary knob 7 for the front shoe section 5 and also a recess 40 for receiving the safety switch member 20 can be seen. Bearing pins 44, 47 are formed in the casing half 2, and a bearing pin 37 is provided in the region of the protruding edge 39 of the casing half 3. Adjacent the bearing pin 37, a tubular section 42 of the casing half 3 comprises a bearing 43 for a cutter shaft 50; the cutter shaft 50 extends into the casing 2, 3, to receive a cutter head while a pulley 51 is fixed on a part of the cutter shaft 50 which projects through the section 42; a continuous drive belt 54 passes round a circumferential surface 52 of the pulley 51 and a pulley 46', which is fixed to an armature shaft of an electric motor, (not shown) which extends coaxially to an axis 46. The pulley 46' is positioned adjacent to an annular casing projection 45, formed on the outside of the casing half 3.

As can be seen from FIG. 1, the trigger 15 (which is also shown in FIG. 2) extends partly into the casing halves 2, 3 and partly into the grip opening 9. A housing 16 containing a switch is mounted inside the casing, next to the trigger 15, so that when the trigger 15 is displaced in the direction of the arrow A (FIG. 2), and therefore into the casing 2, 3, an actuator part 17 of the switch is pushed into the switch housing 16 and thus the switch contacts are closed.

Between the trigger 15 and the actuator part 17 of the switch, an oblong, essentially flat, safety element 21 is mounted in longitudinal tracks, not shown, formed in the casing 2, 3, so that it can be reciprocated in the direction of its longitudinal extension. The safety element 21 comprises two cut-outs 21' in one side, of sizes and spacing of which matched the sizes and spacing of projections 15' formed on the trigger 15. The trigger 15 can therefore only be displaced inwards into the casing in the direction of the arrow A, and consequently into the switch-on position, if the safety element 21 is pushed into a position in which its cut-outs 21' are aligned with the projections 15' so that the projections 15' of the trigger 15 displaced in the direction of the arrow A mesh into the cut-outs 21'. Sufficient movement of the trigger 15 in the direction of the arrow A can take place for the switch to be brought into its on-position. Moreover, the meshing of the projections 15' with the cut-outs 21' ensures that the safety element 21, which can move to and fro in the direction of its longitudinal extension and therefore perpendicular to the direction of movement A, cannot be moved out of position.

Pivotally attached by a pin 22 on an outer end of the safety element 21 is an operating lever 23 which is provided on its end adjacent to the pin 22 with the safety switch member 20, which forms a grip surface for the operation of the safety element 21. The lever 23 in its centre region forms a bush-shaped bearing section 24 which, when the tool is assembled, sits on the bearing pin 44. On its end opposite the pin 22, the lever 23 comprises a bearing shell 25 with which a cross-pin-shaped end of an L shaped lever 26 is coupled so that it can pivot.

The lever 26 has a bush-shaped bearing section 27, which, when the tool is assembled, sits on the bearing pin 47, and is able to pivot. On the bush-shaped bearing section 27 of the lever 26 there is positioned a spring 28 which engage a top side of the lever 23 and thus exerts a return force, acting in the direction of the downward pointing part of arrow C, on that end of the lever 23 which comprises the bearing shell 25.

The end of the L shaped lever 26 opposite the lever 23 is pivotally connected by a pin 29 to a link-lever 30 which is bent at its ends and, when the tool is assembled, extends outwards with its middle section parallel to the longitudinal axes of the bearing pins 44 and 47, so that its outer end, on which a pivot connection 31 is provided, extends into the region which is covered by the cover 4 as shown in FIG. 1.

The link-lever 30 is connected at the pivot connection 31 with an articulated lever 32 which has an extended hole 33 in the region of the pivot connection 31. The other end of the lever 32 is connected so that it pivots about an axis 35 on one end of a brake element 34. The articulated lever 32 lies in a plane which is normal to the middle axes of the bush-shaped bearing sections 24 and 27.

The brake element 34, is plate shaped and consists of the usual brake block material for motor vehicle brakes, for example a thermosetting resin, and has its end opposite the pivot axis 35 pivotally mounted on the bearing pin 37 and held in position by a split washer 38. Around the bearing pin 37 is mounted a helical spring 36 which comprises a rear, up-standing end portion which bears, in a manner not shown, on the protruding edge 39 of the casing half 3. The other end of the spring 36, near the pivot axis 35, lies on the top of the brake element 34, so that (viewing FIG. 2) the brake element 34 is under a force acting in the direction of the downward pointing part of the arrow E, i.e. a force which acts in the direction of rotation of the brake element 34 clockwise around the bearing pin 37.

Figure 3:
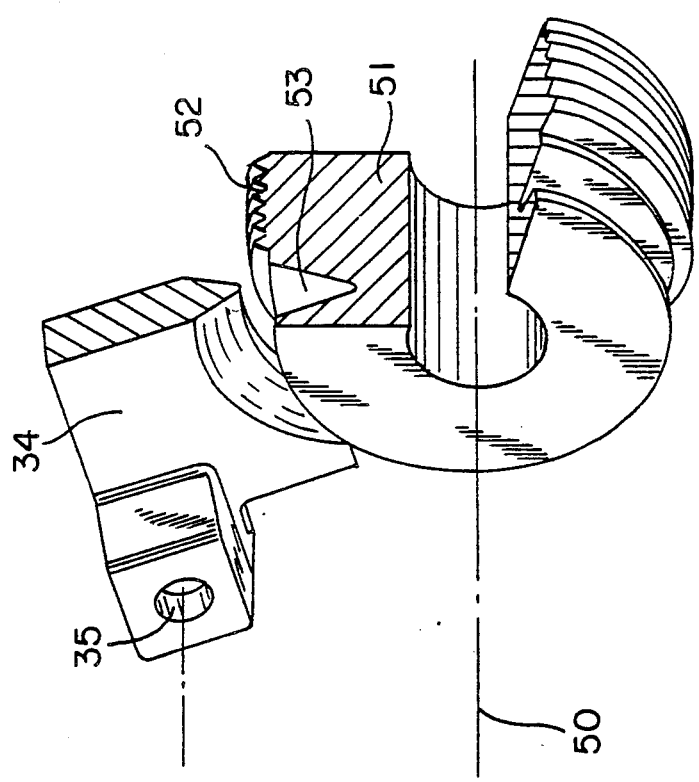
FIG. 3 shows a perspective partial representation of a brake element and a pulley forming a braking surface.

As already mentioned above, next to the bearing pin 37 is the cutter shaft 50, which is carried so that it rotates in the bearing 43. On an outer end the shaft 50, the pulley 51 which consists, for example, of free-cutting steel, is non-rotatably attached, so that when driven it is moved in the direction of the arrow F. Towards the inner face of the pulley 51 an annular slot 53 is formed around its circumference, the side walls of which converge to the base of the slot (FIG. 3). A lower section of the brake element 34 extends into the slot 53, and is curved to match the annular slot 53. In the condition shown in FIG. 2, where the safety element 21 is in the safety position, the lower section of the brake element 34 is pushed by the force of the spring 36 into braking frictional engagement with the side walls of the annular slot 53, thus preventing rotation of the cutter shaft 50.

In use of the planer 1, a cutter head, not shown, attached to the cutter shaft 50, is rotated. To achieve this the operator pushes the safety switch member 20, so that the lever 23 is pivoted on the bearing pin 44 in the direction of the arrow B against the force of the spring 28. Through this pivot movement the safety element 21, which is pivotably connected via the pin 22 with the lever 23, is shifted in the direction of its longitudinal extension, so that the cut-outs 21' move into alignment with the projections 15' of the trigger 15 and the latter can be shifted in the direction of the arrow A to push in the actuator part 17 and therefore to switch on the on/off switch of the hand-held planer 1.

This pivotal movement of the lever 23 in the direction of the arrow B results in swinging the end of the L shaped lever 26 which is coupled with the lever 23 in the direction of the upward pointing part of arrow C, thus rotating the bush-form bearing section 27, seated on the bearing pin 47, in the direction of the downward pointing part of arrow D. This movement causes link-lever 30 to move upwards corresponding to the arrow G. As a result, the pivot connection 31 in the extended hole 33 of the link-lever 32 is displaced in the direction of the upward pointing part of the arrow E so that it engages with the upper end of the hole 33, and through the link-lever 32 the brake element 34 is pivoted anticlockwise around the bearing pin 37. In this way the brake element 34 is disengaged from the side walls of the annular slot 53 of the pulley 51 (FIG. 3).

If, when the brake element 34 is in this position, brought abut by depression of the safety switch member 20, the trigger 15 is pressed into the casing in the direction of the arrow A, then, as already mentioned above the on/off switch is switched on and thus the drive motor of the hand-held planer 1 is activated, which drives the pulley 51 and with it the cutter head seated on the cutter shaft 50 by means of the continuous drive belt 54. When the trigger 15 is in this pressed-in position the projections 15' of the trigger 15 are situated in the cut-outs 21' of the safety element 21, and the latter is therefore held in the position set by pivoting the safety switch member 20 for as long as the operator holds the on/off switch in the switch-on condition with the trigger.

If the operator interrupts the power supply for the drive motor by releasing the trigger 15 and by the resulting displacement of the trigger 15 outwards by the spring force exerted from the switch side, then in the switch-off state of the switch the projections 15' of the trigger 15 come out of mesh with the safety element 21. As a result, due to the actions of the springs 28 and 36 the lever 23 is pivoted back in the direction of the arrow B into its starting position, and the rectangular lever 26 is pivoted in the direction of the downward pointing part of arrow D, so that the link-lever 30 moves in the direction of the downward pointing part of the arrow E and the brake element 34 is pressed by the spring 36 into engagement with the side walls of the annular slot 53, which results in the immediate braking of the cutter shaft 50 and consequently in the cutter head being brought to a halt.

Using the described arrangement, therefore, there is a mechanical braking of the cutter shaft on the release of the trigger and on the associated switching-off of the drive motor of the hand-held planer without the operator having to carry out any additional operations.

We claim:

1. A hand held power tool, comprising:
   a rotary working tool;
   a motor for driving the working tool;
   a trigger for switching the motor on and off;
   a safety element mounted for movement between a safety position, in which the trigger cannot be moved to switch on the motor, and a release position, in which the trigger can be moved to switch on the motor;
   spring means for urging the safety element towards said safety position to normally block the trigger from being movable to switch on the motor;
   interconnecting means for interconnecting the safety element and the trigger so that when the safety element has been moved to said release position and then the trigger moved to switch on the motor, the trigger then holds the safety element in said release position until the trigger is moved to switch off the motor, movement of the trigger to switch the motor off releasing the safety element and allowing the safety element to return to said safety position;
   brake means for braking the rotary working tool by said brake means being brought into braking engagement with a rotary braking part driven by the motor; and
   the safety element being mechanically coupled to the brake means so that the brake means is in braking engagement when the safety element is in said safety position and said brake means is moved out of braking engagement when the safety element is in said release position.

2. A hand held power tool according to claim 1 wherein the safety element is mounted for movement between its safety position and its release position in a direction perpendicular to that of movement of the trigger between its on and its off position.

3. A hand held power tool according to claim 1 comprising additional spring means for urging the brake means towards braking engagement.

4. A hand held power tool according to claim 3 wherein the rotary braking part comprises a rotary member comprising a circumferential braking surface, and the brake means comprises a braking member which can be urged into braking engagement with said surface.

5. A hand held power tool according to claim 4 wherein the rotary member comprises an annular groove with converging side walls the surface of which provides the braking surface.

6. A hand held power tool according to claim 5 comprising a shaft on which the rotary working tool is secured and on which the rotary member is fixed.

7. A hand held power tool according to claim 6 wherein the rotary member is a pulley through which said shaft is driven.

8. A hand held power tool according to claim 4 wherein the braking member comprises an elongated rigid body having one end portion pivotally mounted and the other end portion mechanically connected with the safety element, said member extending transversely of the axis of rotation of the rotary member.

9. A hand held power tool according to claim 8 wherein the braking member comprises a surface which is curved to match and engage the circumferential braking surface of the rotary member.

10. A power planer, comprising:
a housing containing a motor;
a drive pulley rotatably driven by said motor;
a cutter shaft of a cutter head;
a driven pulley mounted on said cutter shaft;
said driven pulley being driven from said drive pulley via an endless belt;
a brake element biased to engage with one of said pulleys to brake said one pulley;
an on/off switch for controlling said motor, said switch having an activator manually movable between on and off positions to energize and de-energize, respectively, said motor;
a safety element interconnected with said switch activator and biased to a blocking position to block operation of said switch activator to said on position when said switch activator is in said off position;
said safety element being manually movable from said blocking position to a permitting position to allow movement of said switch activator from said off position to said on position;
said safety element being connected to said brake element, in said blocking position said safety element allowing said brake element to engage said one pulley, in said permitting position said safety element disengaging said brake element from said one pulley; and
said safety element being biased towards said blocking position to automatically effect engagement of said brake element with said one pulley when said switch activator is moved to said off position.

11. The power planer of claim 10, wherein:
said safety element is connected to said brake element via a plurality of pivotally connected link-levers;
a first spring directly biases said safety element; and
a second and separate spring directly biases said brake element.

12. The power planer of claim 10, wherein said on/off switch is a trigger switch and said switch activator is a trigger.

13. The power planer of claim 12, wherein said trigger and said safety element have interengageable projections and cutouts.

14. The power planer of claim 13, wherein said projections and cutouts only align for interengagement in said permitting position of said safety element, sand said projections are engaged through said cutouts when said switch activator is in said on position.

15. A hand held power tool, comprising:
a motor;
a rotary working tool connected to be rotatably driven by said motor;
an on/off switch having a switch activator movable between on and off positions to energize and de-energize, respectively, said motor;
a brake biased to a braking position to brake rotation of said rotary working tool;
a manually actuated safety element connected to said brake and also interconnected with said switch activator;
said safety element being movable between a safety position and a release position and being biased towards said safety position;
said safety element in said safety position effecting application of said brake to said braking position and simultaneously preventing movement of said switch activator from said off position to said on position;
said safety element when manually held in said release position disengaging said brake to free said rotary working tool for rotation, and simultaneously allowing said switch activator to be moved from said off position to said on position; and
said switch activator when in said on position locking said safety element in said release position to retain said brake disengaged as long as said switch activator is in said on position.

16. The hand held power tool of claim 15, wherein said safety element and said switch activator have mechanically interengageable portions, said portions interengaging in said release position of said safety element and said on position of said switch activator, but said portions being blocked from interengagement when said safety element is in said safety position.

17. The hand held power tool of claim 16, wherein said portions comprise at least one projection on said switch activator and at least one cutout in said safety element.

18. The hand held power tool of claim 15, wherein said safety element pivotally depends from a pivotally mounted safety switch member.

19. The hand held power tool of claim 18, wherein said safety switch member is mechanically connected by a linkage mechanism to a movable brake element of said brake.

20. The hand held power tool of claim 19, wherein said brake element in said braking position engages a pulley mounted on a shaft of said rotary working tool.

* * * * *